US007678501B2

(12) United States Patent
Tomihara et al.

(10) Patent No.: US 7,678,501 B2
(45) Date of Patent: Mar. 16, 2010

(54) STORAGE BATTERY MANUFACTURING METHOD WHICH USES A POLAR PLATE HAVING A FOAMED-METAL ELECTRODE SUBSTRATE AND JOINS A CURRENT COLLECTOR TO THE ELECTRODE SUBSTRATE, AND STORAGE BATTERY OBTAINED THROUGH THE MANUFACTURING METHOD

(75) Inventors: Kei Tomihara, Sumoto (JP); Kazuki Hamasaki, Sumoto (JP); Yoichiri Shibata, Awaji (JP); Takuya Okamoto, Awaji (JP); Kenji Yamato, Minamiawaji (JP); Etsuya Fujisaka, Awaji (JP); Hiroshi Fukuda, Naruto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1021 days.

(21) Appl. No.: 11/393,003

(22) Filed: Mar. 30, 2006

(65) Prior Publication Data
US 2006/0240323 A1 Oct. 26, 2006

(30) Foreign Application Priority Data
Mar. 31, 2005 (JP) ............................ 2005-102254
Sep. 29, 2005 (JP) ............................ 2005-283603

(51) Int. Cl.
*H01M 2/26* (2006.01)
*H01M 10/04* (2006.01)
*H01M 4/66* (2006.01)
*H01M 4/80* (2006.01)

(52) U.S. Cl. ........................ 429/211; 429/94; 429/235; 429/245; 29/623.1

(58) Field of Classification Search .................. 429/94; 229/623.1
See application file for complete search history.

(56) References Cited

U.S. PATENT DOCUMENTS 5,578,397 A * 11/1996 Verhoog et al. ............. 429/211

(Continued)

FOREIGN PATENT DOCUMENTS

CN 1290972 A 4/2001

(Continued)

OTHER PUBLICATIONS

Chinese Office Action dated Feb. 20, 2009, issued in corresponding Chinese Patent Application No. 200610068369.1.

*Primary Examiner*—Dah-Wei D Yuan
*Assistant Examiner*—Amanda Barrow
(74) *Attorney, Agent, or Firm*—Westerman, Hattori, Daniels & Adrian, LLP

(57) ABSTRACT

In the present invention, the electrode assembly is first formed, and then a tab portion is formed by compressing an active material unfilled portion in an electrode having a foamed-metal electrode substrate (Tab Portion Formation Step). Accordingly, in the manufacturing method of the present invention, even if winding misalignment is created in which the edge of the separator is located adjacent to one edge of the active material unfilled portion during the formation of the electrode assembly, the misaligned portion of the separator is pushed in the width direction of the electrode together with the active material unfilled portion when the compression is applied in the Tab Portion Formation Step. Herewith, it is less likely to tuck a part of the separator between the tab portion and the current collector when the current collector is joined in the Current Collector Joining Step.

8 Claims, 9 Drawing Sheets

U.S. PATENT DOCUMENTS

| | | |
|---|---|---|
| 6,241,790 B1 * | 6/2001 | Matsubara et al. ......... 29/623.1 |
| 6,282,785 B1 * | 9/2001 | Kolodziej et al. .......... 29/889.5 |
| 6,284,408 B1 * | 9/2001 | Akazawa et al. ............ 429/211 |
| 6,432,574 B1 | 8/2002 | Suzuki et al. |
| 2005/0031960 A1 * | 2/2005 | Nakahara et al. ............ 429/233 |
| 2005/0042516 A1 * | 2/2005 | Oh et al. ..................... 429/246 |

FOREIGN PATENT DOCUMENTS

JP  62-136759  *  6/1987

* cited by examiner

STORAGE BATTERY MANUFACTURING METHOD WHICH USES A POLAR PLATE HAVING A FOAMED-METAL ELECTRODE SUBSTRATE AND JOINS A CURRENT COLLECTOR TO THE ELECTRODE SUBSTRATE, AND STORAGE BATTERY OBTAINED THROUGH THE MANUFACTURING METHOD

BACKGROUND OF THE INVENTION

[1] Field of the Invention

The present invention relates to alkaline storage batteries including nickel-cadmium storage batteries and nickel-hydrogen storage batteries, and lithium ion storage-batteries and other nonaqueous storage batteries; and a method of manufacturing these storage batteries. The present invention pertains, in particular, to a processing technique for a part of the electrode substrate to which the current collector is joined.

[2] Related Art

In recent year, alkaline storage batteries—such as nickel-cadmium storage batteries and nickel-hydrogen storage batteries, and nonaqueous storage batteries as represented by lithium ion storage batteries having high energy densities are used as electric sources for portable devices (e.g. laptop personal computers) and electric power tools, and furthermore for vehicles (e.g. electric-assisted bicycles, hybrid bikes and hybrid bicycles).

Among the above-mentioned batteries, storage batteries intended for the use of vehicles and electric power tools are required to have high output characteristics and a high energy density. Therefore, regarding the storage batteries for these usages, it is essential to enhance the current collecting efficiency by reducing resistance of the current collecting components and forming a tight joint between the current collector and the electrode substrate of each polar plate. Additionally, as to the storage batteries for vehicles and electric power tools, vibration stemming from the power source or the like of a device in a driving state is transferred also to the storage batteries. It is accordingly necessary for such storage batteries to have high joint strength between the current collector and the electrode substrate of the substrate so that the current collector and the substrate will not come apart from each other as a result of the vibration transmitted from the power source of the device.

A typical structure of alkaline storage batteries, nonaqueous storage batteries and the like is that: a positive and a negative electrodes opposing one another with a separator sandwiched therebetween are spirally wound; disk-shaped current collectors are respectively joined to a part of each electrode substrate (i.e. a tab portion) of the positive and negative electrodes, which projects from a different one of the two side edges of the separator; and all the components in this condition are housed in a case. The case for the storage batteries is composed of a cylindrical case having a bottom and a sealing cap mounted to seal the open end of the case. The positive-electrode current collector connected to the positive electrode is connected to either one of the case or the sealing cap while the negative-electrode current collector is connected to the other.

In late years, foamed nickel has been used as electrode substrates for certain types of storage batteries in order to increase the manufacturing efficiency. However, an electrode substrate made of foamed nickel is as it is difficult to form a joint with a current collector since it is highly porous and has a small density. A usual method adopted to overcome such a difficulty is to weld in advance a ribbon-shaped tab on an edge of the electrode substrate to which the current collector is desired to be joined. Another method with a view to further enhancing the manufacturing efficiency is to compress a portion of the electrode substrate where the current collector is to be joined, and join the current collector to the electrode substrate without using a ribbon-shaped tab, as disclosed in Japanese Laid-Open Patent Application Publication No. S62-136759, for example. The method disclosed in this publication is described next with the aid of FIG. 1A.

Being an electrode substrate made of foamed nickel, a positive electrode 511 is filled with an active material entirely, except for one part. To be more specific, the positive electrode 511 has, in the width direction of the electrode substrate (i.e. the Y-axis direction), (i) an active material filled portion 511a that is filled with the active material and (ii) an active material unfilled portion 511b that is not filled with the active material, as shown in FIG. 1A. The active material unfilled portion 511b corresponds to part of the positive electrode 511 to which the current collector is to be joined (a tab portion). As shown in the magnified image in FIG. 1A, compression is applied to the active material unfilled portion 511b in the width direction of the electrode substrate (i.e. the Y-axis direction) Here, compression is applied so that the length of the active material unfilled portion 511b in the width direction of the positive electrode 511 is reduced to, for example, one-tenth. The above-stated patent publication proposes a technique that increases the density of the active material unfilled portion 511b in the electrode substrate by compression, and thus enables the current collector to be joined to the electrode substrate in a reliable manner while eliminating the need of a ribbon-shaped tab.

When an electrode assembly 510 is formed by winding the above-mentioned electrode 511 together with a negative electrode 512 and a separator 513, however, it is sometimes the case that the separator 513 becomes positionally misaligned in the Z-axis direction (hereinafter, referred to as "winding misalignment"), as shown in FIG. 1B (portion E in FIG. 1B). In the case when the winding misalignment of the separator 513 is created, a misaligned portion 513a of the separator 513, sticking out above the upper edge of the active material unfilled portion 511b of the positive electrode 511 in the Z-axis direction, becomes tucked between the current collector and the positive electrode 511 when the current collector is joined to the positive electrode 511, which possibly results in joint failure. Furthermore, it is required to reduce the size of the active material unfilled portion 511b which does not contribute to the generation of electricity, especially in the present time where an increase in the energy density of storage batteries is desired. Such a reduction in the size further increases the chance of the occurrence of joint failure.

In order to reliably achieve joining of the current collector even when the winding misalignment of the separator 513 has bee created, a method may be adopted in which the relative position of the separator 513 to the positive electrode 511 in the Z-axis direction is changed, as shown in FIG. 2, at the formation of an electrode assembly 515. In such a structure, the upper edge of the separator 513 may be set lower, by a distance $t_{54}$, than the boundary between the active material filled portion 511a and active material unfilled portion 511b of the positive electrode 511, which thus allows a reliable joint of the current collector even if a misaligned portion 513b of the separator 513 is created as indicated by portion F in FIG. 2. As has been already mentioned above, however, further enhancement of the energy density is desired for alkaline storage batteries, nonaqueous storage batteries and the like. Accordingly, it is not acceptable to increase a portion making no contribution to the electric generation (i.e. a portion where the positive and negative electrodes 511 and 512 do not oppose each other with the separator 513 sandwiched therebetween), as in the case of the electrode assembly 515.

In the case where the relative position of the separator to the positive electrode 511 is changed in order to join the current collector in a reliable fashion even when winding misalignment of the separator 513 has been created, a portion of the positive electrode 511 not covered by the separator 513 increases (by an amount corresponding to the distance $t_{54}$), as shown in FIG. 2. As a result, the following disadvantages can be observed: vibration is added to the storage battery; the storage battery becomes subject to damage when dropped or the like happens—for example, part of the positive electrode 511 bends with the impact; and the portion of the positive electrode 511 not covered by the separator 513 causes loss of the active material. Given these issues, it is considered that adopting a structure as shown in FIG. 2 causes a decrease in the storage capacity of the battery, and at the same time, makes the storage battery prone to causing an internal short circuit in the event of vibration being applied, or when the storage battery is dropped, for example.

SUMMARY OF THE INVENTION

Having been made to solve the above-stated problems, the present invention aims at offering (1) a storage battery manufacturing method capable of achieving high manufacturing efficiency by compressing a part of a foamed-metal electrode substrate and joining the current collector to the compressed part, and producing a storage battery less likely to cause an internal short circuit while increasing the energy density, and also (2) such a storage battery.

In order to accomplish the objectives above, the method of manufacturing the storage battery according to the present invention comprises: Electrode Assembly Formation Step; Tab Portion Formation Step; and Current Collector Joining Step. These steps have the following characteristics.

(a) Electrode Assembly Formation Step

In this step, an electrode assembly is formed by positioning a positive electrode and a negative electrode opposite from each other with a separator sandwiched therebetween. Here, each of the electrodes includes an electrode substrate, and has an active material unfilled portion, which is unfilled with an active material, within the electrode substrate along an edge thereof lying perpendicular to the width direction of the electrode substrate. The electrode substrate of at least one of the electrodes is made of foamed metal, and the active material unfilled portion of the electrode having the foamed-metal electrode substrate projects outward from an edge of the separator.

(b) Tab Portion Formation Step

In this step, compression is applied to the active material unfilled portion the electrode having the foamed-metal electrode substrate from the direction opposite to the projection while the relative positions of the positive and the negative electrodes to the separator in the electrode assembly is maintained. Here, the compressed active material unfilled portion is the tab portion.

(c) Current Collector Joining Step

In this step, a platy current collector is joined to the tab portion of the electrode having the foamed-metal electrode substrate (at least one of the positive and the negative electrodes), in abutting contact with the current collector.

In the storage battery manufacturing method of the present invention, the electrode assembly is formed (the Electrode Assembly Formation Step), and subsequently the tab portion is formed by compressing the active material unfilled portion of the electrode having the foamed-metal electrode substrate (the Tab Portion Formation Step), as described above. Therefore, even if winding misalignment is created in which the edge of the separator is located adjacent to one edge of the active material unfilled portion, the misaligned portion of the separator is pushed in the width direction of the electrode (i.e. the opposite direction to the projection of the active material unfilled portion) together with the active material unfilled portion when the compression is applied in the Tab Portion Formation Step. Herewith, it is less likely to tuck part of the separator between the tab portion and the current collector when the current collector is joined in the Current Collector Joining Step.

Note however that, even if the manufacturing method of the present invention is employed, the separator may be tucked between the electrode substrate and the current collector in the Current Collector Joining Step in the case where the winding misalignment in the Electrode Assembly Formation Step is large and the edge of the separator sticks out from the edge of the electrode substrate. However, since forming the electrode assembly before the active material unfilled portion is compressed for the formation of the tab portion, the manufacturing method of the present invention has fewer constraints on dimensions in terms of the relative position of the separator to the positive and the negative electrodes in the width direction of the electrodes, as compared to the conventional manufacturing method. Accordingly, the separator is less likely to be tucked between the electrode substrate and the current collector, and there is a small chance of causing joint failure.

Thus, being less likely to cause joint failure of the current collector even if winding misalignment is created during the formation of the electrode assembly, the manufacturing method of the present invention does not require changing the relative position of the separator to the electrodes shown in FIG. 2. In addition, the finished storage battery of the present invention unlikely causes problems of a bend of the electrodes, loss of the active material and the like, for example, when the storage battery is dropped or when vibration is applied. This results in a reduction in the occurrence of an internal short circuit. For the same reason, the manufacturing method of present invention is capable of providing a large opposing area between the positive and negative electrodes, and has an advantage in increasing energy density of the storage battery.

Furthermore, since the current collector is directly joined, within the foamed-metal electrode substrate, to the tab portion made by compression, the manufacturing method of the present invention does not require to join a metal strip or the like to the electrode substrate of the electrode in advance. This allows for reducing the number of manufacturing steps and the number of parts required, and thus the manufacturing efficiency is improved.

In short, the storage battery manufacturing method of the present invention is capable of achieving high manufacturing efficiency by compressing a part of the foamed-metal electrode substrate and joining the current collector to the compressed part, and reliably producing a storage battery less likely to cause an internal short circuit while increasing the energy density.

The storage battery manufacturing method of the present invention above may take variations as follows.

[Variation 1—Method]

The storage battery manufacturing method of the present invention above may adopt a specific technique in which compression is applied, in the Tab Portion Formation Step, by pressing a pressurizer against the active material unfilled portion of the electrode having the foamed-metal electrode substrate from outside the electrode assembly to the width direction of the electrodes (the direction opposite to the projection of the active material unfilled portion).

[Variation 2—Method]

In the storage battery manufacturing method of the present invention above, the separator may be positioned in the Electrode Assembly Formation Step in a manner that an edge of the separator is in line with or adjacent to the boundary between the active material unfilled portion and the active material filled portion of the electrode having the foamed-metal electrode substrate. That is, even when the separator is positioned with such a positional relationship, the storage battery manufacturing method of the present invention is less likely to cause joint failure between the tab portion of the electrode substrate and the current collector, and therefore effective to increase energy density of the storage battery. Note that, in general, the boundary between the active material filled portion and the active material unfilled portion in the electrode is substantially straight.

[Variation 3—Method]

In the storage battery manufacturing method of the present invention above, it is desirable to apply pressure (for shape maintenance) to the electrode assembly in the facing direction of the positive and negative electrodes during the application of compression in the Tab Portion Formation Step so that the relative positions of the positive and negative electrodes to the separator do not change due to the compression force.

[Variation 4—Method]

In the storage battery manufacturing method of the present invention above, it is desirable to apply compression to the active material unfilled portion so that the height thereof in the direction of the projection is reduced by in the range of 80% to 99%. That is, the active material unfilled portion is preferably compressed to one-fifth of the original height, or shorter (in the direction of the projection).

[Variation 5—Method]

According to the storage battery manufacturing method of the present invention above, part of the tab portion located at the periphery of the electrode assembly in the facing direction of the electrodes can be plastically bent inward in the facing direction, between the Tab Portion Formation Step and the Current Collector Joining Step. Thus, making the partial tab portion inclined prevents undesirable contact of the tab portion with the case of the storage battery.

[Variation 6—Method]

According to the storage battery manufacturing method of the present invention above, the electrode assembly can be spirally wound in the Electrode Assembly Formation Step after being formed by positioning the positive and negative electrodes opposite from each other with the separator sandwiched therebetween. That is, a spirally wound electrode assembly can be formed.

[Variation 7—Method]

According to the storage battery manufacturing method of the present invention above (Variation 6), between the Tab Portion Formation Step and the Current collector Joining Step, a roller capable of spinning may be pressed, from outside in the radial direction of the spirally wound electrode assembly, against the outer lateral side of the partial tab portion located at the periphery of the electrode assembly. Subsequently, by causing the roller to revolve around the electrode assembly, or by causing the electrode assembly to spin around its winding axis, the partial tab portion is pushed inward in the radial direction to thereby plastically bend. Employing such a technique allows for efficiently setting the peripheral tab portion at an inclined angle.

[Variation 8—Method]

According to the storage battery manufacturing method of the present invention above, foamed nickel, for example, may be used in the Electrode Assembly Formation Step as the foamed metal making up the electrode substrate.

The storage battery of the present invention has an electrode assembly and a current collector, each of which is characterized by the following structure.

(a) Electrode Assembly

The electrode assembly includes a positive electrode and a negative electrode opposing each other with a separator sandwiched therebetween. Here, each of the electrodes includes an electrode substrate, and has an active material unfilled portion, which is unfilled with an active material, within the electrode substrate along an edge thereof lying perpendicular to the width direction of the electrode substrate. The electrode substrate of at least one of the electrodes is made of foamed metal, and the active material unfilled portion of the electrode having the foamed-metal electrode substrate projects outward from an edge of the separator.

(b) Current Collector

The current collector is a conductive plate, and joined to the active material unfilled portion of the electrode having the foamed-metal electrode substrate in the electrode assembly.

Here, in the above structure, the active material unfilled portion of the electrode having the foamed-metal electrode substrate has an increased density as a result of compression applied thereto from the direction opposite to the projection, and part of the active material unfilled portion of the electrode having the foamed-metal electrode substrate, located at the periphery of the electrode assembly in the facing direction of the positive and negative electrodes is bent inward in the facing direction.

In the Storage battery of the present invention, the active material unfilled portion is compressed in the width direction of the electrode and thereby has high density (the formation of a tab portion), and the current collector is directly joined to this high-density portion. Therefore, even if a foamed-metal electrode substrate is used for at least one of the electrodes, the manufacture of the storage battery of the present invention can omit a cumbersome manufacturing procedure in which a metal strip is first joined to the electrode and then the current collector is joined to this metal strip. In addition, since it does not require such a metal strip, the present invention also has an advantageous effect in terms of manufacturing costs. In short, adopting the structure of the storage battery of the present invention allows for a reduction in the manufacturing costs.

Additionally, since the partial active material unfilled portion located at the periphery of the electrode inclines inward in the facing direction of the electrodes, the storage battery of the present invention is less likely to cause an internal short circuit when the storage battery is dropped, or when vibration is added from outside, as described above. Accordingly, the storage battery of the present invention is highly reliable when used as an electric source for an electric power tool, or a vehicle (e.g. electric-assisted bicycle, hybrid bike and hybrid bicycle).

Since having adopted a structure in which the active material unfilled portion of the electrode with the foamed-metal electrode substrate is compressed and the current collector is joined to the compressed portion, the storage battery of the present invention is capable of achieving high manufacturing efficiency in the manufacture, and also has an advantage in being less likely to cause an internal short circuit as well as increasing the energy density.

The storage battery of the present invention may take variations as follows.

[Variation 1—Storage Battery]

The storage battery of the present invention above may have a structure in which, in the electrode assembly, the separator has the edge thereof in line with or adjacent to the boundary within the electrode having the foamed-metal electrode substrate, between the active material unfilled portion and the active material filled portion. Herewith, it is possible to achieve a storage battery having high energy density.

[Variation 2—Storage Battery]

The storage battery of the present invention above may have a structure in which the active material unfilled portion of the electrode having the foamed-metal electrode substrate has an increased density of within the range of 500% to 10000%.

Note that having "an increased density of within the above range (500% to 10000%)" means that the active material unfilled portion is compressed by the above-mentioned method of manufacturing the storage battery of the present invention so that the height thereof is reduced by in the range of 80% to 99%, and accordingly the active material unfilled portion has increased density of in the range from 500% to 10000%, as compared to the rest of the foamed-metal electrode substrate to which no compression has been applied.

[Variation 3—Storage Battery]

The storage battery of the present invention above may have a structure in which the electrode assembly is spirally wound.

[Variation 4—Storage Battery]

The storage battery of the present invention above may have a structure in which foamed nickel is used as the foamed metal making up the electrode substrate.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings.

DESCRIPTION OF PREFERRED EMBODIMENTS

The best modes for implementing the present invention are described next with the aid of drawings. Note that specific examples shown below are merely examples for illustrating the structures as well as functions and effects derived from the structures in an easily understood manner, and the present invention is therefore not confined to the following examples other than the characteristic structures of the invention.

Embodiment 1

1. Structure of Storage Battery 1

Figure 3:
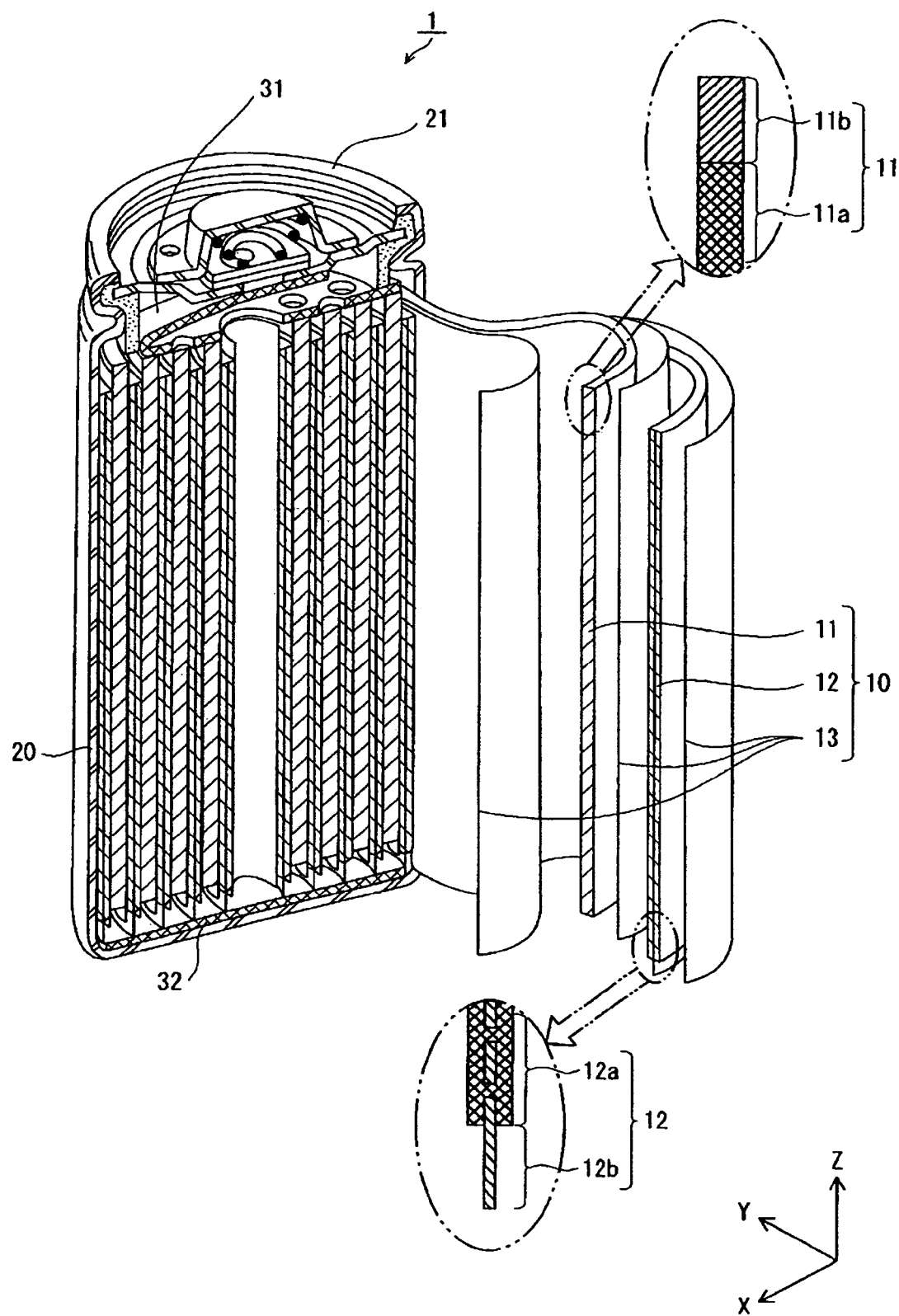
FIG. 3 is a simplified perspective view showing an overall structure of a storage battery 1 according to Embodiment 1 (with a partially cross sectional view)

The structure of a storage battery 1 according to Embodiment 1 is described with the aid of FIG. 3. FIG. 3 is a simplified perspective view showing a structure of the storage battery 1 according to Embodiment 1 (with a partially cross sectional view).

The storage battery 1 has a structure in which a spirally-formed electrode assembly 10 is housed inside a cylindrical case 20 having a bottom, and the top open end of the case 20 is sealed with a sealing cap 21 so that the interior space is sealed off, as shown in FIG. 3. The electrode assembly 10 is formed by first placing a positive electrode 11 and a negative electrode 12 opposite from each other with a separator 13 sandwiched therebetween, and spirally winding these three together as described above. As to the electrode assembly 10, part of the positive electrode 11 is exposed from the upper edge of the separator 13 while part of the negative electrode 12 is exposed from the lower edge.

Note that the interior space of the case 20 where the electrode assembly 10 is placed is filled with an alkali electrolyte solution (not shown). A nylon separator, for example, is used as the separator 13, and a potassium hydroxide (KOH) solution of 30 mass % is used as the alkali electrolyte solution.

The positive electrode 11 is formed by filling an entire foamed-nickel electrode substrate, except for one part, with an active material whose main constituent is nickel hydroxide. As shown in the magnified image in FIG. 3, the positive electrode 11 includes a part which is filled with the active material (hereinafter, referred to as "active material filled portion") 11a and a part which is not filled with the active material (hereinafter, referred to as "active material unfilled portion") 11b. The active material unfilled portion 11b is formed on the upper side of the positive electrode 11 in the width direction (i.e. in the Z-axis direction of FIG. 3), and this is the part of the positive electrode 11 projecting upward from the upper edge of the separator 13 in the electrode assembly 10.

On the other hand, the negative electrode 12 is formed by filling an entire punching-metal electrode substrate, except for one part, with a negative-electrode active material whose main constituent is cadmium oxide. As shown in the other magnified image in FIG. 3, the negative electrode 12 includes an active material filled portion 12a and an active material unfilled portion 12b. The active material unfilled portion 12b is formed on the lower side of the negative electrode 12 in the width direction (the Z-axis direction of FIG. 3), and this is the part of the negative electrode 12 projecting downward from the lower edge of the separator 13 in the electrode assembly 10.

A positive-electrode current collector 31 is joined to the electrode assembly 10 in a condition where the positive-electrode current collector 31 abuts on the upside of the active material unfilled portion 11b, which is part of the positive electrode 11 projecting upward from the upper edge of the separator 13. The positive-electrode current collector 31 has a disk-shaped plate, from a part of which a rectangular lead extends outward in the radial direction. Although FIG. 3 does not provide a detailed view, the active material unfilled portion 11b of the positive electrode 11 is compressed from the upper side in the Z-axis direction toward the lower side, and thus has increased density as compared to the rest of the electrode substrate (as compared to the rest, the density has been increased in the range from 500% to 10000%, for example).

The positive-electrode current collector 31, joined to the edge of the active material unfilled portion 11b of the positive electrode 11 in the electrode assembly 10, is electrically isolated from the case 21, and joined to the inner surface of the sealing cap 21.

A negative-electrode current collector 32 is joined to the negative electrode 12 of the electrode assembly 10 at the edge of the active, material unfilled portion 12b. The negative-electrode current collector 32 is also a disk-shaped plate like the above-described positive-electrode current collector 31; however, a lead portion is not drawn out unlike the positive-electrode current collector 31. In addition, the negative-electrode current collector 32 is joined to the inner bottom surface of the case 20.

The case 20 and the sealing cap 21 are sealed together by means of crimping, with a cap gasket sandwiched therebetween. The structure of the sealing cap 21 is in the public domain—the cap plate is joined to the cap body with these two opposing each other across a space, and a safety valve made up of a spring, a valve plate and the like is provided in the space.

2. Method of Manufacturing Storage Battery 1

A method of manufacturing the storage battery 1 having the above-mentioned structure is described next with the aid of FIGS. 4 to 6.

2-1. Manufacture of Positive-Electrode Intermediate 110

The present embodiment defines the positive electrode 11 as a positive electrode having the active material unfilled portion 11b formed by compression (see FIG. 3), while defining a positive electrode intermediate 110 as a positive electrode to which the compression is not yet applied.

Figure 4A:
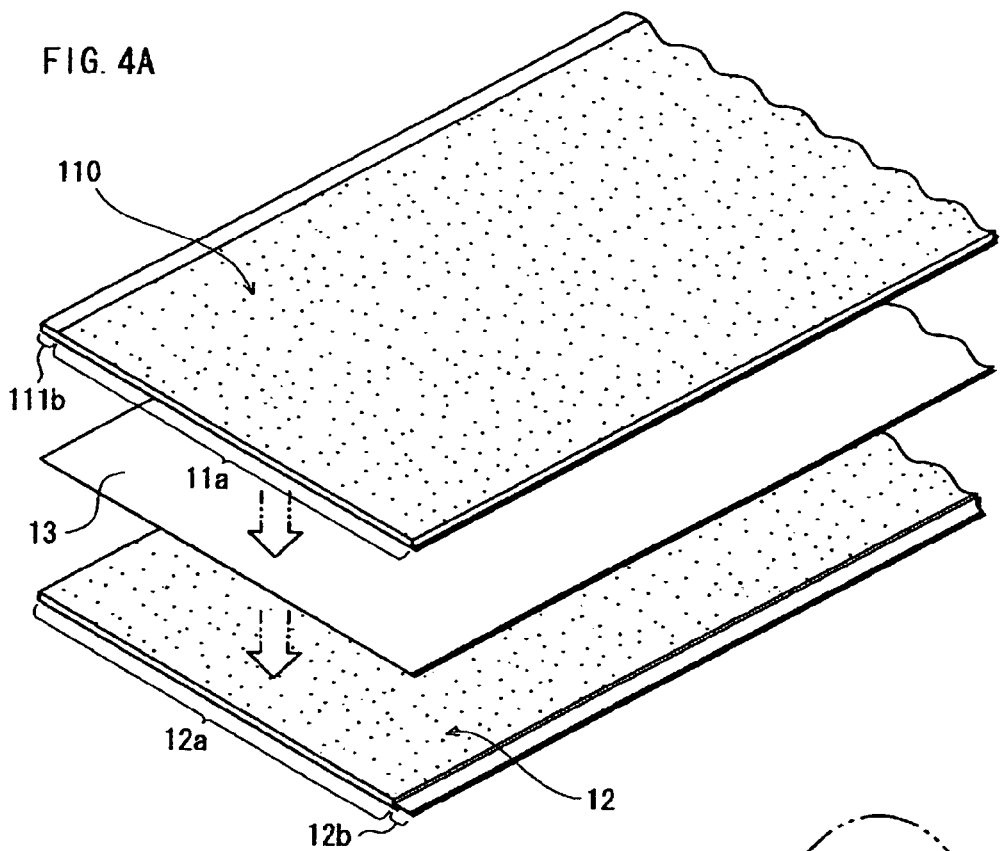
FIG. 4A is a developed perspective view showing an operational step of the manufacturing process of the storage battery 1, in which a positive electrode intermediate 110 and a negative electrode 12 are placed opposite from each other with a separator 13 sandwiched therebetween.

The positive-electrode intermediate 110 is structured by filling a foamed-nickel electrode substrate with a positive-electrode active material slurry made up with a binder and a positive-electrode active material whose main constituent is nickel hydroxide. As shown in FIG. 4A, the positive-electrode active material slurry is applied to the entire electrode substrate, except for a part in the width direction of the electrode substrate (i.e. the Y-axis direction). Thus, a portion filled with the positive-electrode active material slurry is the active material filled portion 11a, while a portion not filled with the positive-electrode active material slurry is the active material unfilled portion 111b.

After drying of the electrode substrate, which is filled with the positive-electrode active material slurry in the above described manner, the electrode substrate is then rolled to be a predetermined thickness (e.g. 0.5 mm), and cut into a predetermined size (e.g. 200 mm in length and 33 mm in width). Here, a dimension $t_1$ (see FIG. 4B) of an active material unfilled portion 111b of the positive electrode intermediate 110 is 1.0 mm, for example.

In the above-described manner, the positive electrode intermediate 110 is made.

2-2. Manufacture of Negative Electrode 12

In the manufacture of the negative electrode 12, first, a negative-electrode active material slurry made up with a binder and a negative-electrode active material whose main constituent is cadmium oxide is applied to both sides of a punching-metal electrode substrate. After being dried, the resulting electrode substrate is rolled to be a predetermined thickness (e.g. 0.6 mm), and cut into a predetermined size (e.g. 240 mm in length and 33 mm in width).

Note that, in the manufacture of the negative electrode 12 also, the negative-electrode active material slurry is applied to the entire electrode substrate, except for a part in the width direction (i.e. the Y-axis direction) of the electrode substrate. Thus, a portion filled with the negative-electrode active material slurry is the active material filled portion 12a, while a portion not filled with the negative-electrode active material slurry is the active material unfilled portion 12b, as shown in FIG. 4A. In the manufacture of the storage battery 1 of the present embodiment, the width of the active material unfilled portion 12b (in the Y-axis direction) in the negative electrode 12 is 1.0 mm, for example.

2-3. Manufacture of Electrode Assembly Intermediate 100

The positive electrode intermediate 110 and negative electrode 12 manufactured in the above-described manner are placed opposite from each other with the separator 13 sandwiched therebetween, as shown in FIG. 4A. At this point, the positive electrode intermediate 110 and the negative electrode 12 are individually positioned so that the active material unfilled portion 111b of the positive electrode intermediate 110 sticks out from one edge of the separator 13 while the active material unfilled portion 12b of the negative electrode 12 sticks out from the other edge of the separator 13. Used here as the separator 13 is a nylon separator having a length of 550 mm and a width of 33 mm, for example.

Figure 4B:
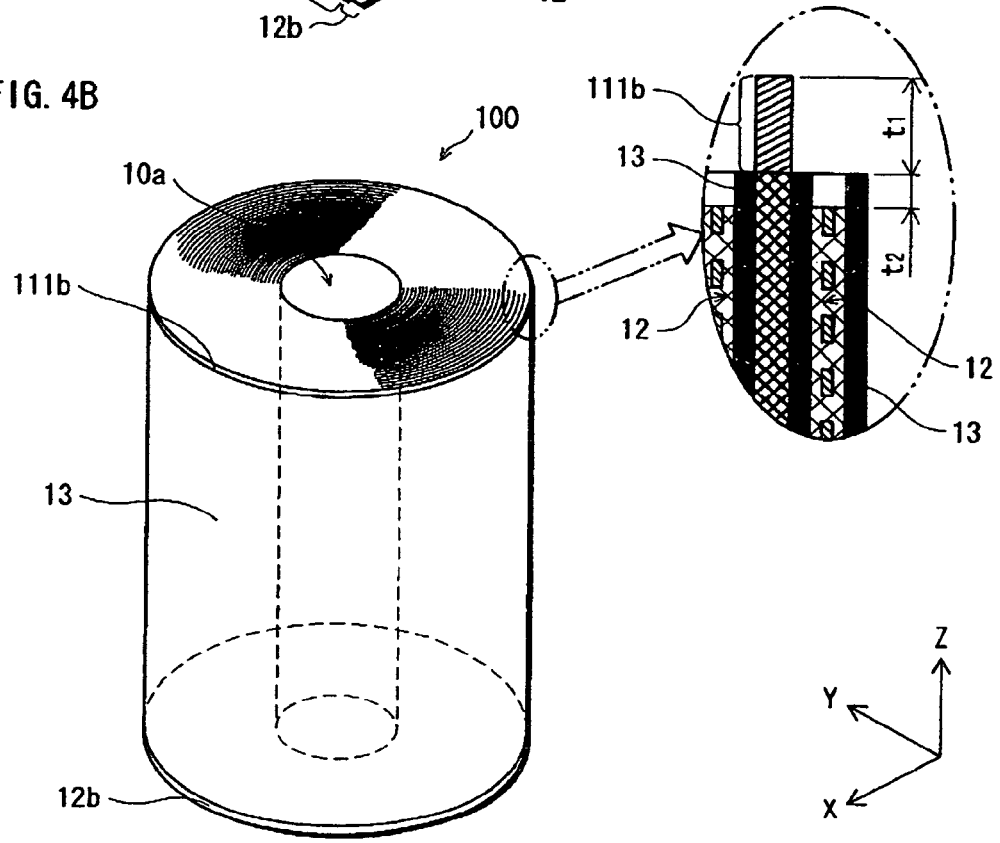
FIG. 4B is a simplified perspective view of an electrode assembly intermediate 100 of the storage battery 1 (with a partially cross sectional view)

Next, an electrode assembly intermediate 100 is manufactured by the winding process in which the positive electrode intermediate 110, the negative electrode 12 and the separator 13 are wound together while the above positional relation among the three is maintained. Note that, after the winding process, cellophane tape is put on the outermost perimeter of the electrode assembly intermediate 100 to fix it. A winding core used in the winding process is taken out, leaving a hollow 10a in the center of the electrode assembly intermediate 100, as shown in FIG. 4B.

As described above, in the electrode assembly intermediate 100, the active material unfilled portion 111b of the positive electrode intermediate 110 sticks out by the dimension $t_1$ from the separator's 13 upper edge in the Z-axis direction (see the magnified image in FIG. 4B), and the active material unfilled portion 12b of the negative electrode 12 sticks out from the separator's 13 lower edge in the Z-axis direction. Note that the negative electrode 12 is arranged to have its upper edge positioned a dimension $t_2$ (e.g. 1.0 mm) below the separator's 13 upper edge in the Z-axis direction, as shown in the magnified image of FIG. 4B.

Note that, in the manufacture of the storage battery 1 according to the present embodiment, the electrode assembly intermediate 100 is manufactured by a winding process under publicly known conditions.

2-4. Compression of Active Material Unfilled Portion 111b of Positive Electrode Intermediate 110

Next is described compression of the active material unfilled portion 111b of the positive electrode intermediate 110, which is the most important key feature of the manufacturing method of the storage battery 1 according to the present embodiment, with the aid of FIG. 5.

Figure 5A:
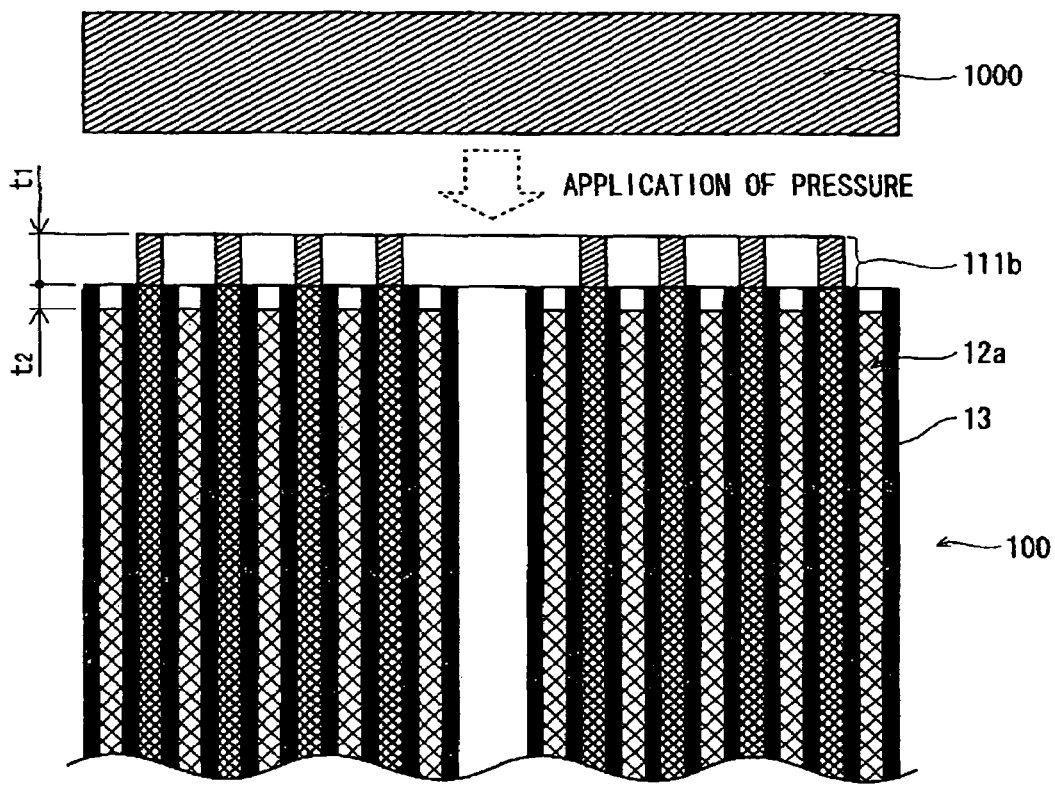
FIG. 5A is a simplified perspective view showing an operational step of the manufacturing process of the storage battery 1, in which an active material unfilled portion 111$b$ of the positive electrode intermediate 110 in the electrode assembly intermediate 100 is compressed.

A pressurizer 1000 is pressed against the electrode assembly intermediate 100 from the upper side in the Z-axis direction, as shown in FIG. 5A, to thereby compress in the width direction (the Z-axis direction) the active material unfilled portion 111b of the positive electrode intermediate 110 sticking out from the upper edge of the separator 13. Note that the electrode assembly intermediate 100 is manufactured in a manner that the active material unfilled portion 111b before compression has a dimension of $t_1$ (e.g. 1.0 mm), as described above, and the separator 13 holds a relative position to the positive electrode intermediate 110, in which the upper edge of the separator 13 is situated at or around the level of the boundary between the active material unfilled portion 111b and the active material filled portion 11a. In addition, the negative electrode 12 is positioned to have its upper edge the dimension $t_2$ (e.g. 1.0 mm) below the separator's 13 upper edge in the Z-axis direction.

Figure 5B:
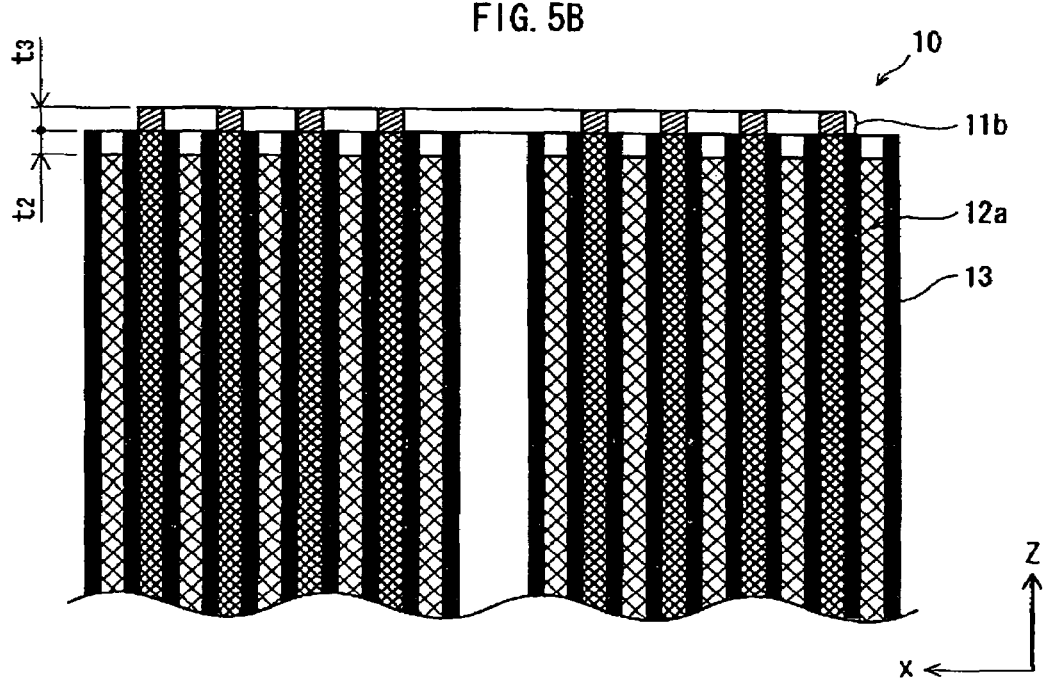
FIG. 5B is a simplified cross sectional view of an electrode assembly 10.

The active material unfilled portion 111b of the positive electrode intermediate 110, after compression is applied thereto by the pressurizer 1000 from the upper side in the Z-axis direction toward the lower side, has a dimension of $t_3$ (e.g. 0.1 mm), as shown in FIG. 5B. At this point, the upper edges of the separator 13 and negative electrode 12 are free of the influence of the compression force from the pressurizer 1000, and the dimension $t_2$ is therefore maintained.

Thus, the electrode assembly 10 manufactured in the above-described manner has, as a component, the positive electrode 11 having the active material unfilled portion 11b that serves as a tab portion. Note that, at the time of the application of compression to the active material unfilled portion 111b using the pressurizer 1000, pressure may be exerted on the electrode assembly intermediate 100 in the radial direction, from the outside of the electrode assembly intermediate 100 to the inside, so that the relative positions of the positive electrode intermediate 110 and negative electrode 12 to the separator 13 within the electrode assembly intermediate 100 are not changed and the electrode assembly intermediate 100 maintains its shape.

In addition, by compressing the active material unfilled portion 111b in the above operational step, the density of the part of the foamed-nickel electrode substrate increases by 1000%, as compared to the rest of the electrode substrate.

2-5. Joining of Current Collectors 31 and 32

Figure 6:
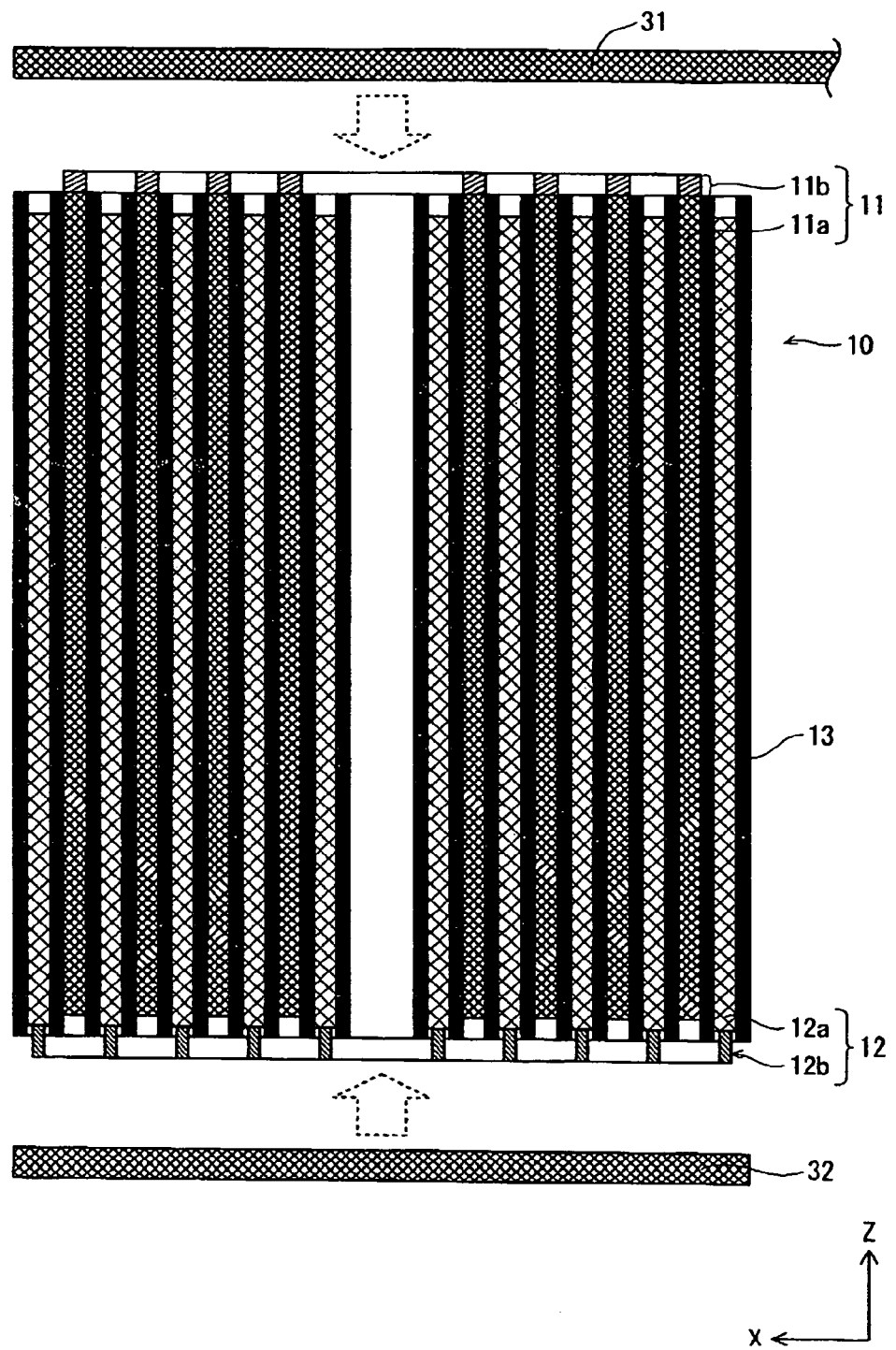
FIG. 6 is a simplified cross sectional view of an operational step of the manufacturing process of the storage battery 1, in which a positive-electrode current collector 31 and a negative-electrode current collector 32 are joined to the electrode assembly 10.

The positive-electrode current collector 31 is, as shown in FIG. 6, mounted on the electrode assembly 10 manufactured through the above operational steps—more specifically speaking, mounted on the upper edge of the active material unfilled portion 11b functioning as a tab portion of the positive electrode 11, and then the positive-electrode current collector 31 and the positive electrode 11 are joined together by resistance welding, for example. Alternatively, energy beams may be used for the joining.

In addition, the negative-electrode current collector 32 is positioned to abut on the lower edge of the active material unfilled portion 12b, which serves as a tab portion of the negative electrode 12. The negative-electrode current collector 32 and the negative electrode 12 are joined together by resistance welding, for example, without providing space therebetween. In this case also, energy beams may be used for the joining, instead of resistance welding.

In the above fashion, the joining of the current collectors 31 and 32 to the electrode assembly 10 is completed.

2-6. Assembly of Storage Battery 1

Although no diagrammatic representation is provided here, the electrode assembly 10 with the current collectors 31 and 32 joined to the upper and lower sides thereof is housed in the cylindrical case 20 having a bottom (see FIG. 3) At this point, a lead portion (a part extending in the shape of a strip) of the positive-electrode current collector 31 should be folded back.

Then, the negative-electrode current collector 32 is joined to the inner bottom surface of the case 20 by resistance welding or the like, and one end of the lead portion of the positive-electrode current collector 31 is joined to the inner surface of the sealing cap 21. Subsequently, an alkali electrolyte solution is poured into the case 20 while the sealing cap 21 is placed to stand up in the central-axis direction of the case 20, and the case 20 and the sealing cap 21 are sealed together by means of crimping, with a cap gasket sandwiched therebetween. Note that, before the alkali electrolyte solution is poured, a groove process is applied to part of the case 20 close to the opening to thereby provide a diameter-reduced portion. After the pouring of the alkali electrolyte solution, the sealing cap 21 is mounted on the diameter-reduced portion, and then the sealing cap 21 and the diameter-reduced portion of the case 20 are crimped together.

Thus, the assembly of the storage battery 1 is completed.

3. Advantageous Effects of Storage Battery 1 and Manufacturing Method Thereof

Concerning the storage battery 1 and the manufacturing method of the same according to the present embodiment, the positive electrode intermediate 110 and the negative electrode 12 are positioned opposite from each other with the separator 13 sandwiched therebetween, and these three are spirally wound together to form the electrode assembly intermediate 100, and subsequently the active material unfilled portion 111b of the positive electrode intermediate 110 is compressed using the pressurizer 1000. With this compression, the compressed active material unfilled portion 11b, which functions as a tab portion of the positive electrode 11, is formed. Thus, although using an electrode substrate made of formed nickel, the present embodiment is able to form the tab portion by density increase while not requiring a further manufacturing step of joining a metal strip or the like to the active material unfilled portion 11b, and the positive-electrode current collector 31 is joined directly to the tab portion. Thus, by cutting out the conventional manufacturing step of joining a metal strip for the joining of the current collector, the manufacturing method of the present embodiment achieves a reduction in the number of parts required as well as in the number of manufacturing steps.

Figure 7A:
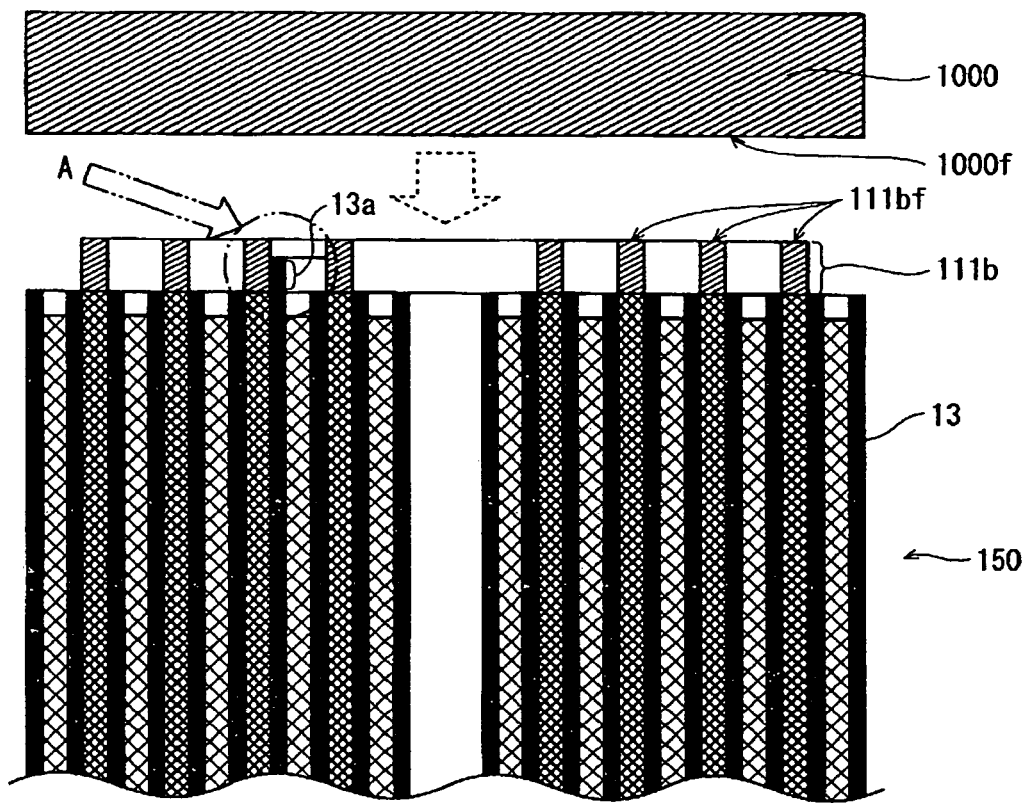
FIG. 7A is a simplified cross sectional view showing a compressing step which compresses the active material unfilled portion 111$b$ of the positive electrode in an electrode assembly intermediate 150, where winding misalignment is created in part of the separator 13, in the direction of the winding axis.
Figure 7B:
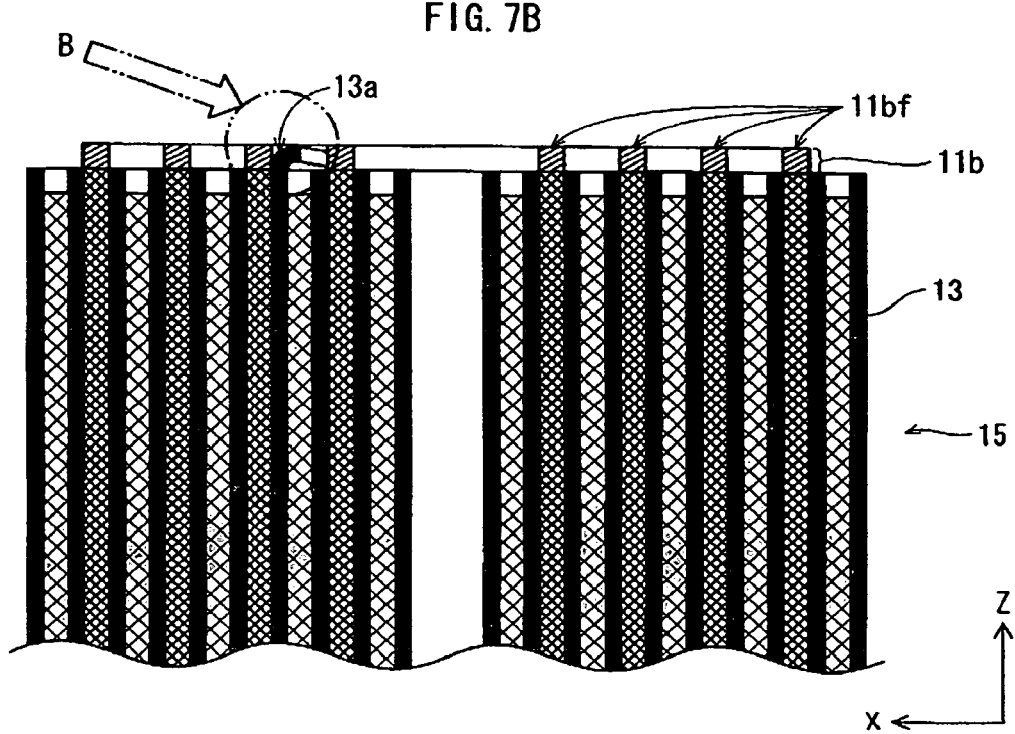
FIG. 7B is a simplified cross sectional view of an electrode assembly 15.

In the manufacturing method of the storage battery 1 according to the present embodiment, the tab portion is formed by compressing the active material unfilled portion 111b after the electrode assembly intermediate 100 is formed by the winding process, as described above. Therefore, even if part of the upper edge of the separator 13 becomes misaligned (13a in portion A of FIG. 7A) from its proper position toward the upper side in the Z-axis direction due to winding misalignment created in the electrode assembly intermediate 100, as shown in FIG. 7A, the misaligned portion 13a of the separator 13 is pressed down when the pressurizing surface 1000f of the pressurizer 1000 is compressing the upper edge of the active material unfilled portion 111b of the positive electrode intermediate 110. As a result, after the pressure application by the pressurizer 1000, the misaligned portion 13a of the separator 13 bends as shown in FIG. 7B, and folds down at the same height as, or lower in the Z-axis direction than an upper edge 11bf of the active material unfilled portion 11b of the positive electrode 11 (portion B of FIG. 7B).

According to such an arrangement, the manufacturing method of the storage battery 1 of the present embodiment is less likely to have the separator 13 tucked between the upper edge 11bf of the active material unfilled portion 11b and the positive-electrode current collector 31 when the positive-electrode current collector 31 is joined to the active material unfilled portion 11b of the positive electrode 11. Herewith, in the case of using this manufacturing method, joint failure of the positive-electrode current collector 31 is less likely to occur.

The manufacturing method of the storage battery 1 according to the present embodiment is thus able to work around the winding misalignment of the separator 13 using the above strategy. Herewith, unlike the conventional technique shown in FIG. 2, it does not require, as a way to counter the winding misalignment, to change the positional relationship in the width direction between the separator 513 and the positive electrode 511. In the case of employing the manufacturing method of the storage battery 1 of the present embodiment, therefore, the active material filled portion 11a of the positive electrode 11 is abutted against and covered with the separator 13, and there is a low chance that the positive-electrode active material becomes detached from the positive electrode 11 even when vibration is applied at the time of driving the finished storage battery 1, or the storage battery 1 is dropped. As a result, the performance degradation of the storage battery 1 due to the above reasons can be suppressed, and the storage battery 1 is less likely to cause an internal short circuit due to loss of active material.

In addition, it is possible to create a configuration in which the active material filled portion 11a of the positive electrode 11 efficiently opposes the active material filled portion 12a of the negative electrode 12, which allows for an increase in effective opposing areas of the electrodes 11 and 12. Accordingly, the storage battery 1 of the present embodiment has high energy density.

For these reasons, the storage battery 1 and the manufacturing method according to the present embodiment achieves high energy density and a reduction in the occurrence of an internal short circuit.

Embodiment 2

Figure 8A:
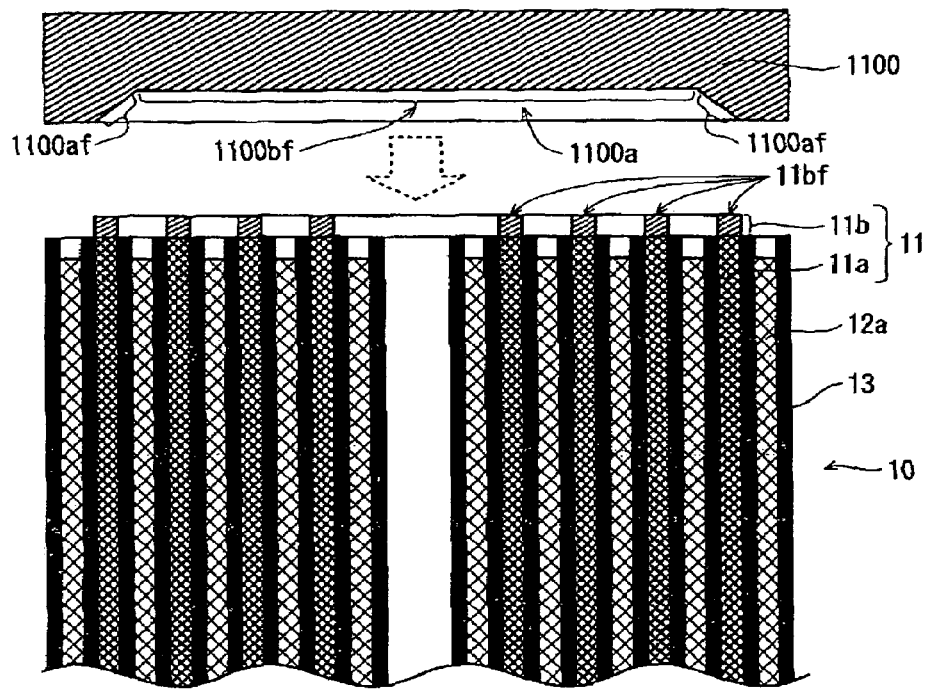
FIG. 8A is a simplified cross sectional view showing a bending process of the manufacturing process of a storage battery according to Embodiment 2, in which a partial active material unfilled portion 11$b$ of a positive electrode 11 located at the periphery of the electrode assembly 10 is bent inward.
Figure 8B:
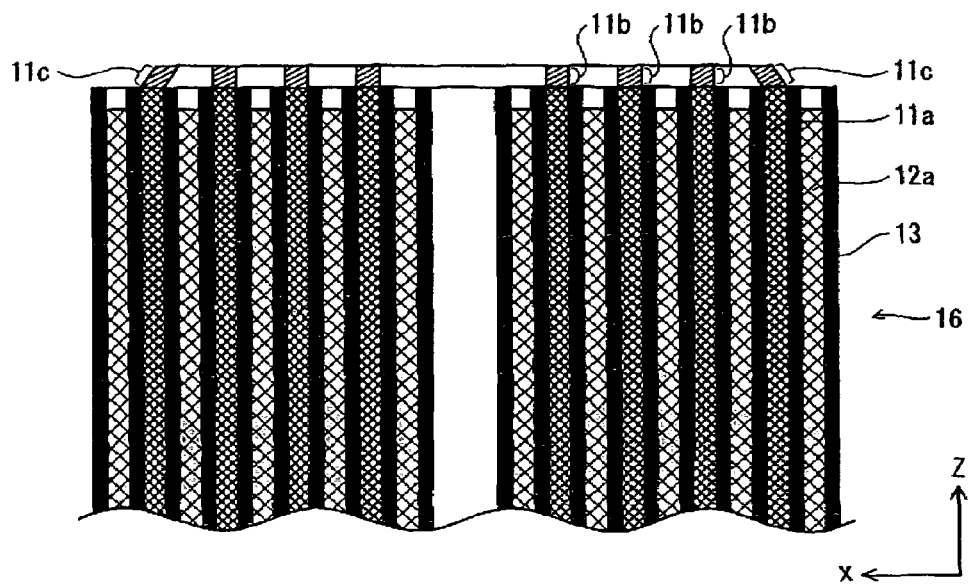
FIG. 8B is a simplified cross sectional view of an electrode assembly 16 after the bending process of the storage battery according to Embodiment 2.

Next is described a manufacturing method of a storage battery according to Embodiment 2, with the aid of FIGS. 8A and 8B. FIG. 8A shows an operational step added to the manufacturing method of the storage battery 1 of Embodiment 1 above, and carried out after the compression of the active material unfilled portion 111b of the positive electrode intermediate 110 (the operational step shown in FIG. 5A). FIG. 8B shows a cross sectional view of an electrode assembly 16 formed through the added operational step.

In the manufacturing method of the storage battery of the present embodiment, a bending mold 1100 is employed after the active material unfilled portion 11b, which will serve as a tab portion of the positive electrode 11, is formed by compression. The bending mold 1100 is pressed from the upper side in the Z-axis direction against part of the active material unfilled portion 11b located at the electrode assembly's 10 periphery in the radial direction, as shown in FIG. 8A.

In the bending mold 1100, a concave portion 1100a is formed on the bottom surface with a depression extending therefrom upward in the Z-axis direction. Of internal surfaces 1100bf and 1100af facing the concave portion 1100a, the side surface 1100af is arranged to make an acute angle with the Z axis, and thus sloped. By pressing the bending mold 1100 against the active material unfilled portion 11b of the positive electrode 11 in the electrode assembly 10, the part of the active material unfilled portion 11b located at the electrode assembly's 10 periphery—a tab portion—is bend inward in the radial direction (i.e. the X-axis direction).

In the electrode assembly 16 after the bending step, a partial active material unfilled portion 11c located at the periphery of the electrode assembly 16 is inclined inward in the radial direction of the electrode assembly 16, as shown in FIG. 8B. Note that the peripheral active material unfilled portion 11c is inclined at, for example, 30° to the Z axis.

Regarding the bending mold 1100 used in the bending step, the inclination angle of the side surface 1100af to the Z axis is made slightly larger than that of the active material unfilled portion 11c (e.g. 30°). This arrangement is adopted in view of the rebound of the active material unfilled portion 11c occurring when the bending mold 1100 is released. The angle setting should be adjusted depending on a material used for the electrode substrate.

The manufacturing method of the storage battery of the present embodiment is characterized by carrying out the above bending step, and the rest of the operational steps are the same as those of the manufacturing method of Embodiment 1. Note that, since the bending step has been applied as described above, the manufacturing method of the present embodiment has an advantageous effect in terms of preventing contact of the tab portion of the positive electrode 11 with the case 20.

Note that, since including the same operational steps of the manufacturing method of Embodiment 1, the manufacturing method of the present embodiment obviously has the same advantageous effects as the manufacturing method of Embodiment 1 above.

Embodiment 3

Figure 9A:
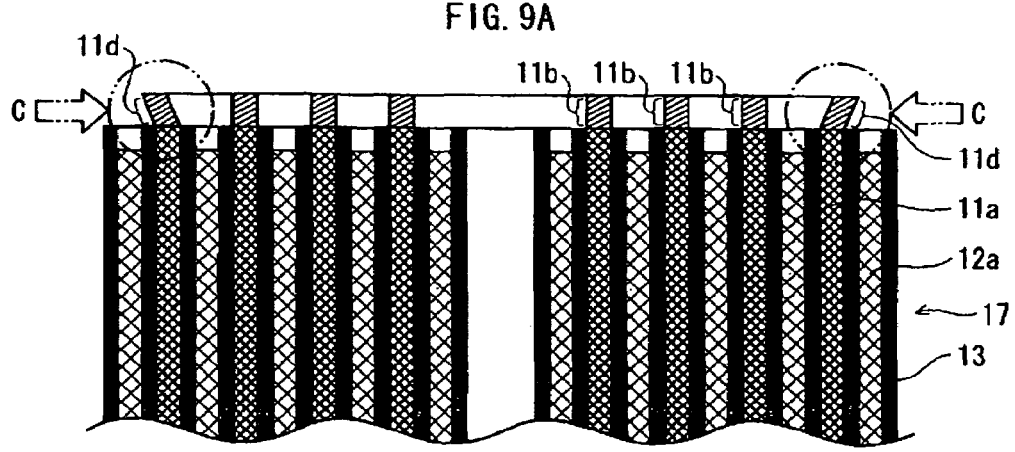
FIG. 9A is a simplified cross sectional view showing a state in which a peripheral active material unfilled portion 11$d$ is bent outward in the radial direction of an electrode assembly 17 during the compression of the active material unfilled portion 11$b$ of the positive electrode 11.
Figure 9B:
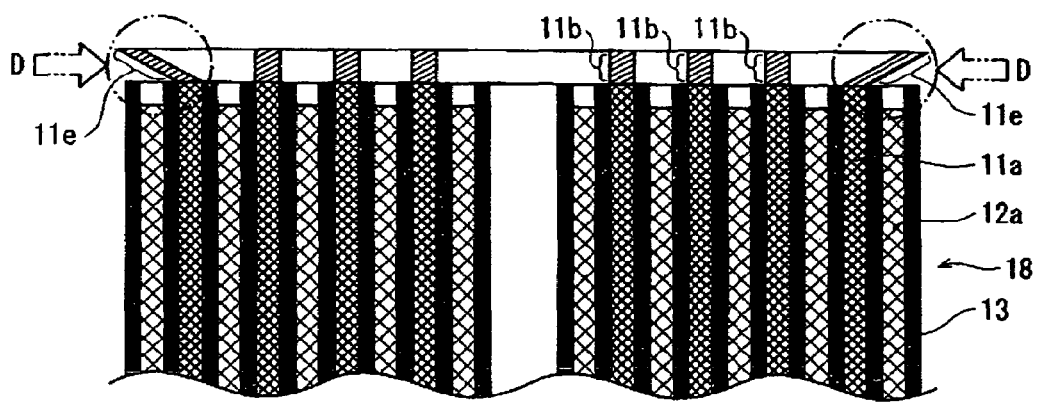
FIG. 9B is a simplified cross sectional view showing a state in which a peripheral active material unfilled portion 11$e$ is bent further outward in the radial direction of an electrode assembly 18 (as compared to the state shown in FIG. 9A) during the compression of the active material unfilled portion 11$b$ of the positive electrode 11.
Figure 9C:
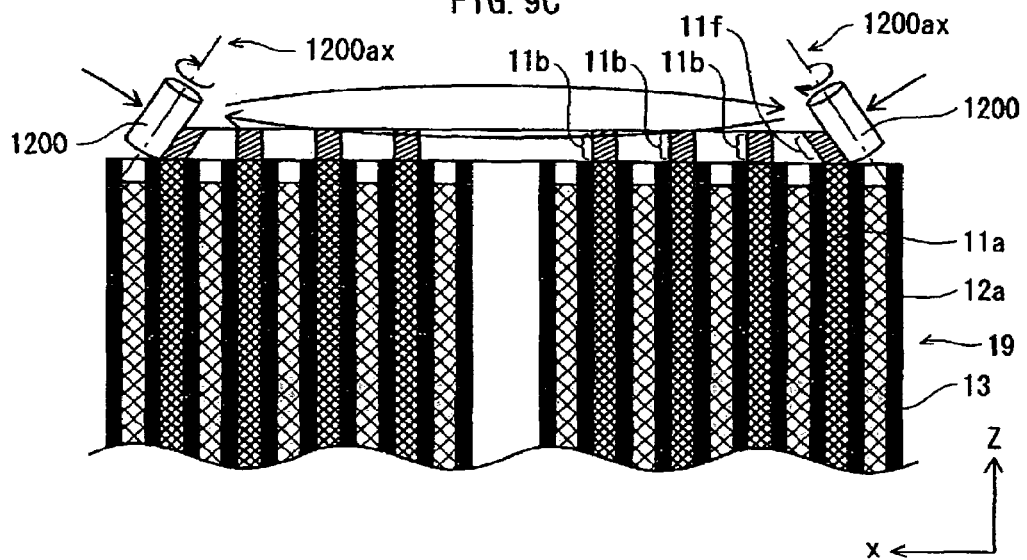
FIG. 9C shows a part of a manufacturing process of a storage battery according to Embodiment 3, and is a simplified cross sectional view showing a bending step in which a peripheral active material unfilled portion 11$f$ of the positive electrode 11 is bent inward in the radial direction of an electrode assembly 19 by pressing bending rollers 1200 against the electrode assembly 17 or 18.

Next is described a manufacturing method of a storage battery of Embodiment 3, with the aid of FIGS. 9A to 9C.

If compression is exerted on the active material unfilled portion 111b of the positive electrode intermediate 110 at the stage of the electrode assembly intermediate 100, a peripheral active material unfilled portion 11d of the post-compression positive electrode 11 may, as shown in FIG. 9A, be undesirably bent outward in the radial direction of an electrode assembly 17 (portion C of FIG. 9A). This happens because no adjacent active material unfilled portion exists on the outer side of the peripheral active material unfilled portion 11d, and therefore nothing stops the peripheral active material unfilled portion 11d from being bent.

Furthermore, the situation shown in FIG. 9B may be present embodiment is characterized by carrying out the above bending step, and the rest of the operational steps are the same as those of the manufacturing method of Embodiment 1. Note that, since the bending step has been applied as described above, the manufacturing method of the present embodiment has an advantageous effect in terms of preventing contact of the tab portion of the positive electrode 11 with the case 20.

Note that, since including the same operational steps of the manufacturing method of Embodiment 1, the manufacturing method of the present embodiment obviously has the same advantageous effects as the manufacturing method of Embodiment 1 above.

Embodiment 3

Next is described a manufacturing method of a storage battery of Embodiment 3, with the aid of FIGS. 9A to 9C.

If compression is exerted on the active material unfilled portion 111b of the positive electrode intermediate 110 at the stage of the electrode assembly intermediate 100, a peripheral active material unfilled portion 11d of the post-compression positive electrode 11 may, as shown in FIG. 9A, be undesirably bent outward in the radial direction of an electrode assembly 17 (portion C of FIG. 9A). This happens because no adjacent active material unfilled portion exists on the outer side of the peripheral active material unfilled portion 11d, and therefore nothing stops the peripheral active material unfilled portion 11d from being bent.

Furthermore, the situation shown in FIG. 9B may be brought, during the compressing step, to a partial active material unfilled portion 11e of the positive electrode 11 located at the periphery of the electrode assembly 18: the peripheral active material unfilled portion 11e has its edge further outside the outermost perimeter of the separator 13 in the electrode assembly 18 (portion D of FIG. 9B).

If the electrode assemblies 17 and 18 in the states shown in FIGS. 9A and 9B, respectively, are used as they are, the peripheral active material unfilled portions 11d and 11e of the positive electrode 11 may not be able to form a good joint with the positive-electrode current collector 31 at the electrode assemblies' 17 and 18 periphery in the radial direction. Furthermore, in the case of FIG. 9B, when the electrode assembly 18, after the current collectors 31 and 32 have been joined thereto, is placed in the case 20, an edge of the peripheral active material unfilled portion 11e of the positive electrode 11 could possibly come in contact with the internal surface of the case 20. Accordingly, the electrode assemblies 17 and 18 in the states of FIGS. 9A and 9B cannot be used as they are in the post operational steps.

Given this factor, in the manufacturing method of the storage battery according to the present embodiment, bending rollers 1200 are used, as shown in FIG. 9C, on the electrode assemblies 17 and 18 in the states shown in FIGS. 9A and 9B. Herewith, the outwardly bent active material unfilled portions 11d and 11e of the positive electrode 11 are bent inward in the radial direction of the electrode assemblies 17 and 18 (the X-axis direction). To be more specific, as shown in FIG. 9C, each bending roller 1200 is arranged so that a central axis 1200ax makes a predetermined angle (e.g. 5° to 85°) with the winding axis (the Z axis) of the electrode assemblies 17 and 18, and is abutted on a peripheral active material unfilled portion 11f of an electrode assembly 19. In the manufacturing method of the present embodiment, the electrode assembly 19 is rotated around its central axis while the bending rollers 1200 are abutted thereon, and the peripheral active material unfilled portion 11f is thereby pressed inward in the radial direction of the electrode assembly.

Herewith, the peripheral active material unfilled portion 11f is bent using the bending rollers 1200. Note that, in the manufacturing method of the present embodiment, each bending roller 1200 is structured to be able to spin around the central axis 1200ax while the electrode assembly 19 is structured to be rotatable around the winding axis with the bending rollers 1200 abutted thereon. Instead of causing the electrode assembly 19 to rotate, the bending rollers 1200 may be moved around the electrode assembly 19 remaining in a static state.

In the manufacturing method of the storage battery of the present embodiment, the storage battery is manufactured through the same operational steps as in the above Embodiment 1, except for the bending step shown in FIG. 9C.

Therefore, the manufacturing method of the storage battery according to the present embodiment also has the same advantageous effects as the manufacturing method of Embodiment 1 above, and additionally has the same advantageous effects as the manufacturing method of Embodiment 2.

Verification Experiment

The following explains a method and results of a verification experiment conducted to verify the advantageous effects of the respective above Embodiments 1, 2 and 3.

1. WORKING EXAMPLE 1

Used as samples of the storage battery of Working Example 1 are ones adopting a structure of the storage battery 1 according to Embodiment 1 and made by the manufacturing method of Embodiment 1. Each dimension in FIGS. 5A and 5B are as follows:

$t_1 = 1.0$ mm;

$t_2 = 1.0$ mm; and $t_3 = 0.1$ mm.

Note that the remaining dimensions and the materials used are the same as in Embodiment 1 above.

The storage battery sample of Working Example 1 is identified as "A".

2. WORKING EXAMPLE 2

Used as samples of the storage battery of Working Example 2 are ones made by the manufacturing method of the storage battery according to Embodiment 2 above. Note that the individual dimensions $t_1$, $t_2$ and $t_3$ are the same as those in Working Example 1 above.

The inclination angle $\theta_1$ of the peripheral tab portion 11c of the positive electrode 11 is about 30°.

In the present working example, the dimensions other than $t_1$, $t_2$ and $t_3$ and the materials used are the same in Embodiment 2 above.

The storage battery sample of Working Example 2 is identified as "B".

3. WORKING EXAMPLE 3

Used as samples of the storage battery of working Example 3 are ones made by the manufacturing method of the storage battery according to Embodiment 3 above. Note that the individual measures $t_1$, $t_2$ and $t_3$ are the same as those in Working Examples 1 and 2 above.

The inclination angle $\theta_2$ of the peripheral tab portion 11f of the positive electrode 11 is in the rage of 5° to 85°.

In the present working example, the dimensions other than $t_1$, $t_2$ and $t_3$ and the materials used are the same as in Embodiment 3 above.

The storage battery sample of Working Example 3 is identified as "C".

4. COMPARATIVE EXAMPLE

Figure 1A:
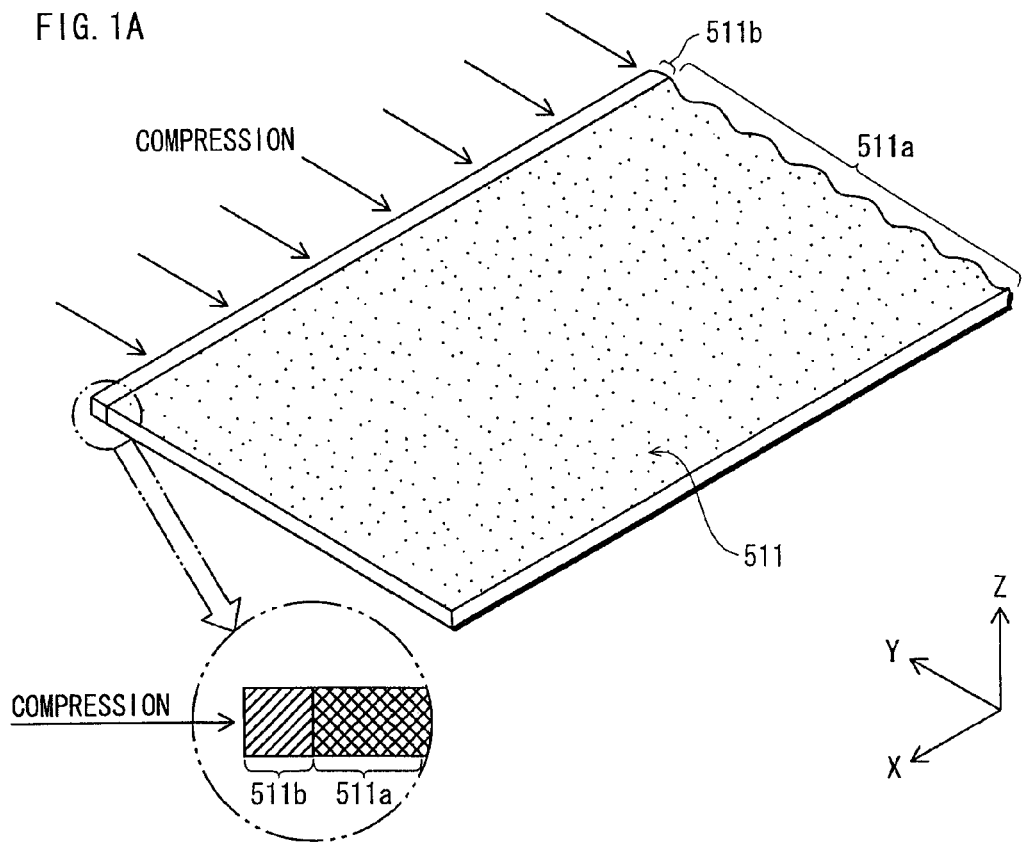
FIG. 1A is a simplified perspective view showing an operational step of a conventional storage battery's manufacturing process, where an active material unfilled portion 511$b$ of a positive electrode 511 is compressed in the width direction of the positive electrode 511.
Figure 1B:
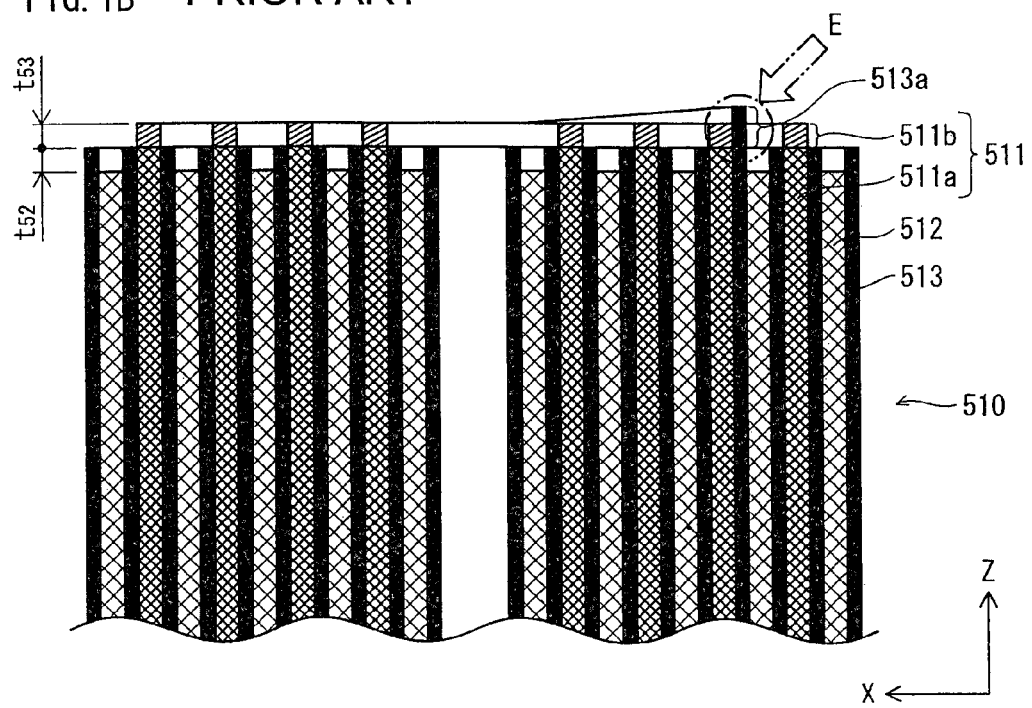
FIG. 1B is a simplified cross sectional view of an electrode assembly 510 with a separator 513 partially having winding misalignment in the direction of the winding axis, which is developed during the manufacture of the conventional storage battery.
Figure 2:
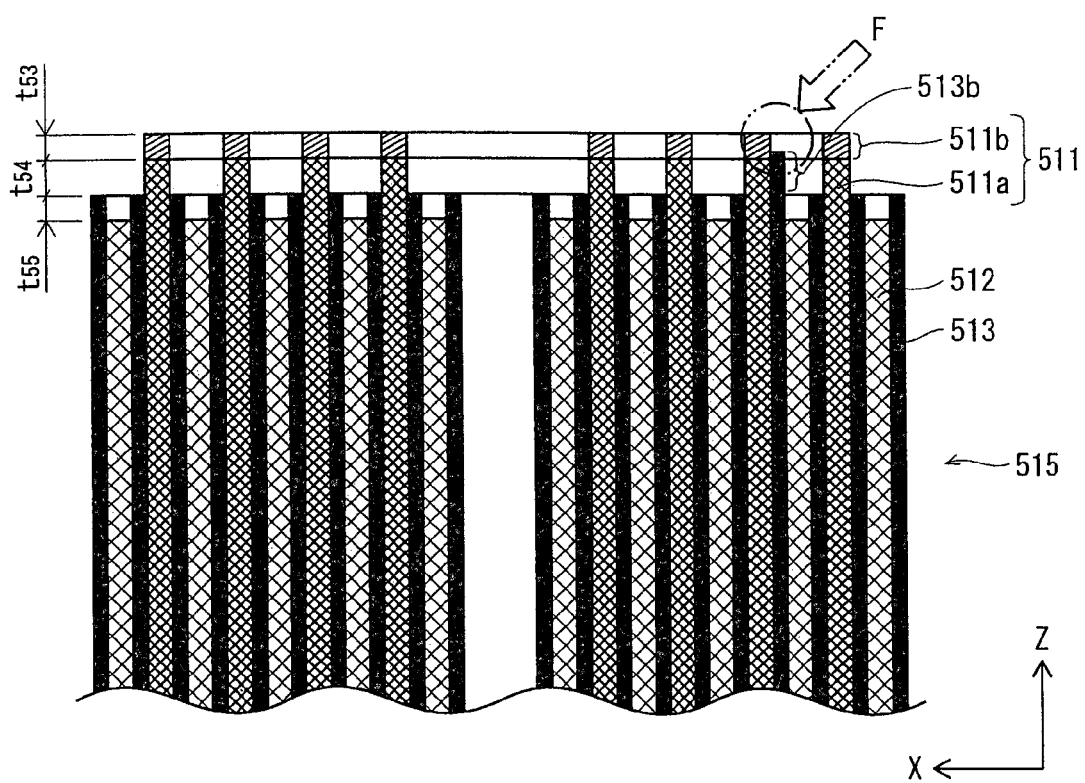
FIG. 2 is a simplified cross sectional view of an electrode assembly 515 formed by a conventional storage battery manufacturing method, in which the relative position of the separator 513 to the positive electrode 511 has been changed in expectation of the formation of winding misalignment.

Created as samples of the storage battery of Comparative Example are ones whose electrode assembly has the same structure as the electrode assembly 515 of the conventional technique shown in FIG. 2 while the remaining parts has the same structure as those in Embodiment 1 above:

$t_{53}$=0.1 mm;

$t_{54}$=0.5 mm; and $t_{55}$=0.5 mm.

Note that the width of the tab portion (the active material unfilled portion) 511b of the positive electrode 511 before the compression is the same as in the above Working Example 1 and others, i.e. 1.0 mm.

The storage battery sample of Comparative Example is identified as "X".

5. EXPERIMENTAL METHOD

A hundred each of storage batteries for samples A, B, C and X according to Working Examples 1 to 3 and Comparative Example, respectively, were prepared and the following experiment was conducted.

Each of the storage batteries for samples A, B, C and X is dropped onto the concrete floor from a height of 2 m. Then, the number of batteries causing an internal short circuit after the drop test was counted for each sample A, B, C and X. The results are shown in TABLE 1.

TABLE 1

| Sample | Number of samples tested [pieces] | Samples causing internal short circuit [pieces] |
|---|---|---|
| A | 100 | 2 |
| B | 100 | 0 |
| C | 100 | 0 |
| X | 100 | 7 |

Regarding the storage battery sample X according to Comparative Example, seven out of a hundred storage batteries, i.e. 7%, caused an internal short circuit, as shown in TABLE 1.

On the other hand, concerning the storage battery sample A according to Working Example 1, two storage batteries, i.e. 2%, caused an internal short circuit. The storage battery samples B and C had no occurrence of an internal short circuit.

The differences in the occurrence percentages of an internal short circuit, as described above, is considered to be attributable to the following factor: as to the storage battery sample X, the upper edge of the separator 513 is positioned lower than the boundary between the tab portion (the active material unfilled portion) 511b and the active material filled portion 511a of the positive electrode 511, as shown in FIG. 2, and therefore the area of the positive electrode 511 covered by the separator 513 is smaller when compared to any of the storage battery samples A, B and C according to Working Examples of 1, 2 and 3, respectively. To be more specific, regarding the storage battery sample X whose separator 513 covers a smaller area of the active material filled portion 511a of the positive electrode 511, the positive electrode 511 is considered to be likely to come in contact with the negative electrode when it bends with the impact in the drop test, or likely to cause loss of the active material.

On the other hand, the storage battery sample A is created so that the boundary between the active material filled portion 11a and the active material unfilled portion 11b of the positive electrode 11 is located at or around the level of the upper edge of the separator 13, and almost the entire active material filled portion 11a of the positive electrode 11 is therefore covered by the separator 13. Given this factor, it is considered that the positive electrode 11 of the storage battery sample A of Working Example 1 was less likely to bend, which resulted in effectively preventing the positive electrode 11 from coming into contact with the negative electrode 12, or preventing the active material from coming off from the positive electrode 11.

As to the storage battery sample A according to Working Example 1, since the tab portion 11b is formed by compressing the active material unfilled portion 111b of the positive electrode intermediate 110 after the formation of the electrode assembly intermediate 100 (see FIG. 5), the separator 13 is never tucked between the positive-electrode current collector 31 and the upper edge of the active material unfilled portion 11b of the positive electrode 11 when the positive-electrode current collector 31 is joined. In respect to this point also, the occurrence of an internal short circuit, due to imperfect welding between the active material unfilled portion 11b of the positive electrode 11 and the positive-electrode current collector 31, is considered to be reduced in the storage battery sample A of Working Example 1.

On the other hand, the storage battery samples B and C of Working Examples 2 and 3 use the bending mold 1100 and the bending rollers 1200, respectively, and the active material unfilled portions 11c and 11f of the positive electrode 11 located at the periphery of the electrode assemblies 16 and 19 are bent inward in the radial direction of the electrode assembly 16 and 19. Accordingly, in these storage battery samples B and C, it is considered that the upper edges of the active material unfilled portions 11c and 11f of the positive electrode 11 did not come in contact with the internal surface of the case in the drop test, and the occurrence of an internal short circuit was further prevented.

As has been described, the storage battery samples A, B and C according to Working Examples 1, 2 and 3 are less likely to cause an internal short circuit even when drop impact is applied thereto, and excel the storage battery sample X according to Comparative Example in terms of quality stability.

Other Particulars

Embodiments 1 to 3 above and the storage battery samples A to C used in the verification experiment are merely examples to illustrate the structure, functions and advantageous effects of the present invention in an easily understood manner, and therefore the battery of the present invention is not confined to those. This is also the case with the manufacturing method of the storage battery of each embodiment. For example, in Embodiments 1 to 3 above, nickel-cadmium storage batteries having a cylindrical shape are used as examples; however, the present invention is also applicable to storage batteries having a prismatic shape. In the case of prismatic storage batteries, a layered electrode assembly (i.e. a stacked electrode assembly) is sometimes used instead of a spirally wound electrode assembly. When such an electrode assembly is used, hold pressure may be applied from the periphery during the compression for the formation of the tab portion so that the shape of the electrode assembly is maintained.

Besides the nickel-cadmium storage batteries, the present invention is also applicable to alkaline storage batteries such as nickel-hydrogen storage batteries, and furthermore applicable to lithium ion storage batteries and other nonaqueous storage batteries. In short, the present invention is applicable to storage batteries having a foamed-metal electrode substrate—e.g. a foamed-nickel electrode substrate, and to the manufacture of such storage batteries.

In order to form the tab portion (the active material unfilled portion) 11b of the positive electrode 11 in Embodiments 1 to 3 above, the corresponding part of the electrode substrate is compressed so that the height is reduced to one-tenth. However, the compression ratio should be decided in view of balance of the density of a foamed-metal to be used, the readiness to join to the current collector 31 and the like. For example, it is practical to perform the compression so that the height of the post-compression active material unfilled portion 11b is reduced to no more than one-fifth of the height of the pre-compression active material unfilled portion 111b. In the case of using foamed-metals employed for the manufacture of common storage batteries, it is practical to keep the compression ratio in the range of 500% to 10000% in view of the densities of such foamed-metals.

Additionally, some numerical values are provided in Embodiments 1 to 3 and Working Examples 1 to 3 above as examples; however, they are not essential features of the present invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A method of manufacturing a storage battery, comprising the steps of:
   (a) forming an electrode assembly by positioning a positive electrode and a negative electrode opposite from each other with a separator sandwiched therebetween,
   wherein each of the electrodes includes an electrode substrate, and has an active material unfilled portion, which is unfilled with an active material, within the electrode substrate along an edge thereof lying perpendicular to a width direction of the electrode substrate,
   the electrode substrate of at least one of the electrodes is made of foamed metal, and
   the active material unfilled portion of the at least one electrode projects outward from an edge of the separator;
   (b) forming a tab portion by applying compression to the active material unfilled portion of the at least one electrode from a direction opposite to the projection while maintaining relative positions of the electrodes to the separator within the electrode assembly, the compressed active material unfilled portion being the tab portion, part of the tab portion located at a periphery of the electrode assembly being plastically bent inward in a facing direction of the electrodes; and
   (c) joining a platy current collector to the tab portion in abutting contact with the current collector.

2. The method of claim 1, wherein in the step (b), the compression is applied by pressing a pressurizer against the active material unfilled portion of the at least one electrode and pushing the pressurizer in the opposite direction.

3. The method of claim 1, wherein
   the at least one electrode includes, in a plane direction thereof, the active material unfilled portion and an active material filled portion which is filled with the active material, and a boundary between the active material unfilled portion and the active material filled portion is substantially straight, and
   in the step (a), the separator is positioned so that the edge of the separator is in line with or adjacent to the boundary.

4. The method of claim 1, wherein in the step (b), the compression is applied while force is exerted on the electrode assembly in a facing direction of the electrodes.

5. The method of claim 1, wherein in the step (b), the compression is applied so that a height of the active material unfilled portion of the at least one electrode in a direction of the projection is reduced by in the range of 80% to 99%.

6. The method of claim 1, wherein in the step (a), the electrode assembly, after the formation, is spirally wound.

7. The method of claim 6, wherein
   a roller capable of spinning is pressed, from outside in a radial direction of the spirally would electrode assembly, against an outer lateral side of part of tab portion located at a periphery of the electrode assembly, and
   subsequently, by causing the roller to revolve around the electrode assembly, or by causing the electrode assembly to spin around a winding axis thereof, the partial tab portion is pushed inward in the radial direction to thereby plastically bend.

8. The method of claim 1, wherein in the step (a), foamed nickel is used as the foamed metal.

* * * * *